Oct. 22, 1957 W. F. SPANG 2,810,155
HAMBURG PATTY MAKING MACHINE
Filed April 4, 1956 2 Sheets-Sheet 1
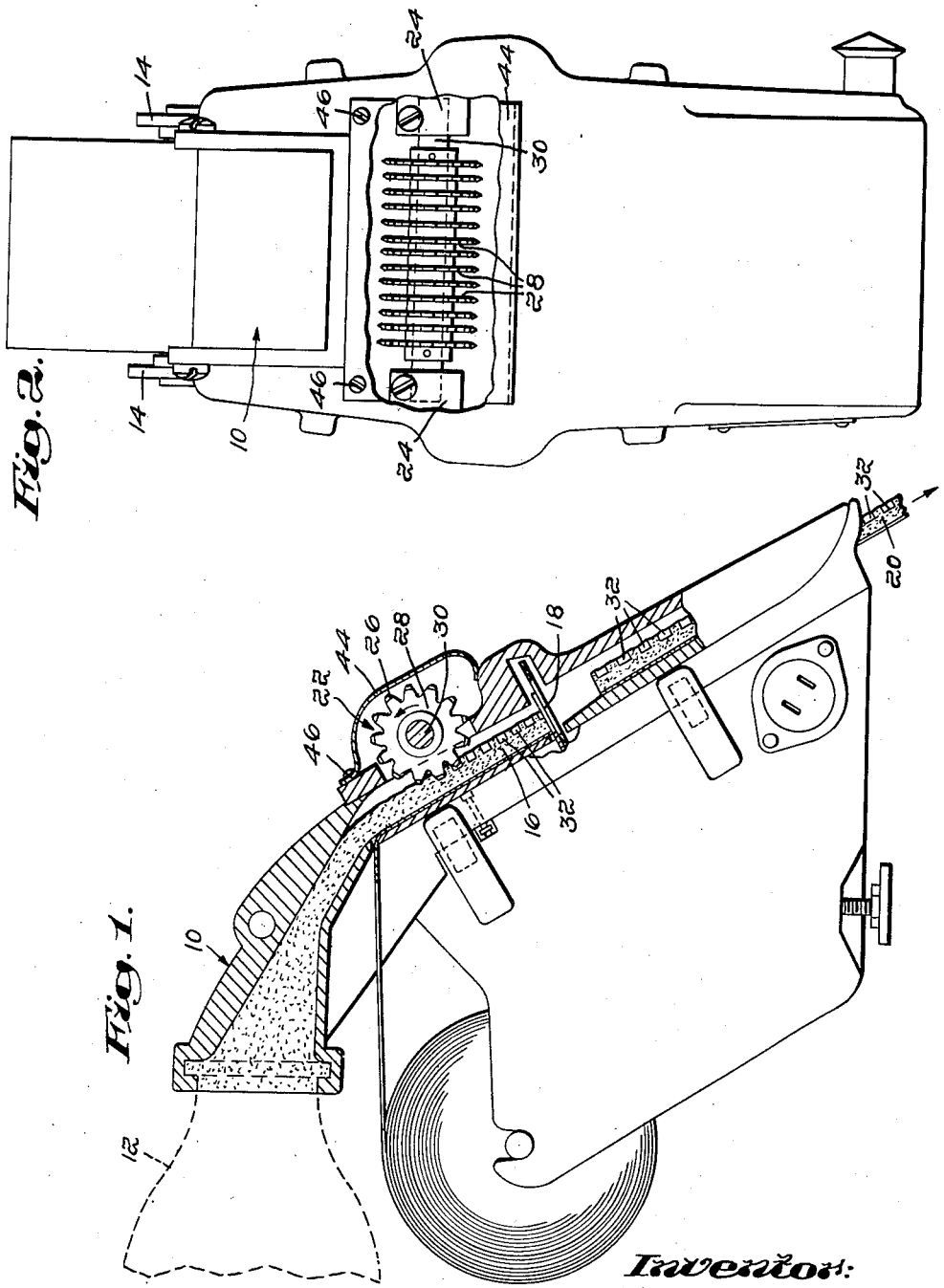
Inventor:
William F. Spang,
by Kenway, Jenney, Witter & Hildreth
Attorneys

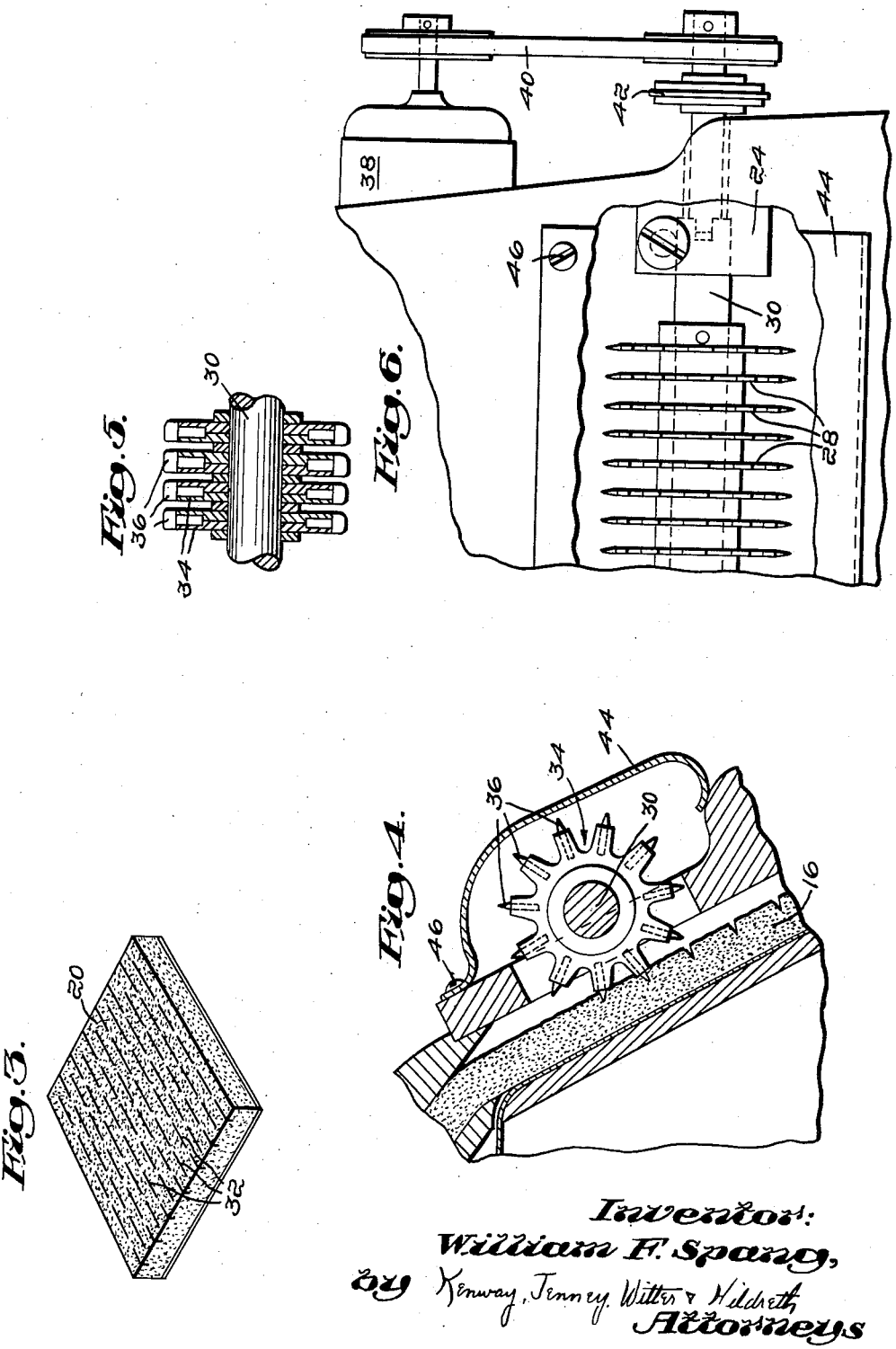

United States Patent Office 2,810,155
Patented Oct. 22, 1957

2,810,155

HAMBURG PATTY MAKING MACHINE

William F. Spang, Medfield, Mass., assignor to Needham Manufacturing Company Inc., Needham Heights, Mass., a corporation of Massachusetts Application April 4, 1956, Serial No. 576,049

1 Claim. (Cl. 17—32)

This invention relates to hamburg patty making machines in which ground meat is passed through an extruding chamber which forms it into a ribbon-like strip and from the forward end of which are cut individual patties of predetermined size. In some cases these patties have been run through meat tenderizing machines which mark the patties with parallel rows of intermittent cuts thereby simulating tenderized steaks. My invention contemplates the mounting of a bladed cylinder on the patty forming machine and so disposed that the blades penetrate the extruded strip and mark the same as the cylinder rotates with the movement of the strip. The production of a novel combination of this nature and for the purpose described comprises the primary object of the invention.

These and other features of the invention will be best understood and appreciated from the following description of preferred embodiments thereof selected for purposes of illustration and shown in the accompanying drawing in which:

Fig. 1 is a side elevation, partially in section, of a machine embodying the invention, Fig. 2 is a plan view of the machine partly broken away, Fig. 3 is a perspective view of a meat patty formed by the machine, Fig. 4 is a fragmentary sectional view of a modified construction, Fig. 5 is a fragmentary view of a portion of Fig. 4, and Fig. 6 is a fragmentary view of the machine and illustrating a modified construction.

In the accompanying drawings I have illustrated a hamburg patty making machine of the nature shown in application Serial No. 555,518, filed December 27, 1955, now Patent No. 2,784,448, issued March 12, 1957, the same being in the form of an attachment 10 adapted to be applied to the delivery end of a meat grinding machine. In the drawings, 12 indicates an annular adaptor adapted to be applied to the delivery end of the grinding machine and 14 indicates quick release clamps for securing the attachment to the adaptor.

The entrance end of the extruding chamber is of circular configuration and the chamber is gradually inclined therefrom to a relatively wide and shallow rectangular slot disposed horizontally at the delivery end and adapted to extrude ground meat into a flat strip 16. A knife 18 mounted for vertical reciprocation is provided for cutting patties 20 from the end of the strip.

Some users of hamburg patty machines desire that the patties shall resemble tenderized steaks formed by passing meat patties through a tenderizing machine and for this reason they pass the hamburg patties through a tenderizing machine. The primary object of my invention resides in the provision of means for thus marking the extruded strip as it is formed, thereby eliminating the necessity of passing the patties through a tenderizing machine.

For the purpose of thus marking the patties I have mounted a bladed cylinder 22 on the machine for free rotation in end bearings 24. The cylinder comprises a plurality of groups of blades 26, each group of blades being integral with and extending outwardly from a disk 28. The several disks are mounted in spaced relation on and along a supporting shaft 30 rotatable in the bearings 24. The cylinder is so disposed in the machine that the blades penetrate into and mark the extruded strip with parallel lines of spaced cuts or penetrations 32 as the cylinder rotates simultaneously with the movement of the strip.

It will be understood that the shape of the blades can be modified as desired and in Figs. 4 and 5 I have illustrated a cylinder 34 provided with blades 36 extending longitudinally of the cylinder.

The cylinder is of light weight and freely rotatable by engagement with the moving extruded strip. It might however in some cases be desirable to aid rotation of the cylinder and in Fig. 6 I have illustrated a small motor 38 for this purpose. The cylinder is driven from the motor through a belt 40 and preferably a light friction clutch 42 is also provided for permitting the cylinder to override the drive from the motor, it being understood that the sole purpose of the motor is to deliver a light driving force to the cylinder.

A removable guard 44 secured by screws 46 provides a covering for the cylinder 22 or 34. It will be apparent that the bladed cylinder automatically marks the advancing strip 16 with such cuts as are desired on the patties.

Having thus disclosed my invention what I claim as new and desire to secure by Letters Patent is:

A hamburg patty forming machine, comprising a housing having an extruding chamber extending therethrough and open at feeding and delivery ends, the inner walls of the chamber being gradually inclined from a circular configuration at the feeding end to a relatively wide and shallow rectangular slot disposed horizontally at the delivery end and adapted to extrude ground meat into a flat strip of predetermined width, and a cylinder mounted for free rotation on a horizontal axis extending transversely across the housing adjacent to its delivery end and having outwardly extending elements at its periphery disposed to penetrate and mark said strip with parallel lines of spaced pentrations into the strip as the cylinder is rotated simultaneously by and with the movement of the strip.

References Cited in the file of this patent

UNITED STATES PATENTS

| | | |
|---|---|---|
| 2,302,398 | Spang | Nov. 17, 1942 |
| 2,752,629 | Shadid | July 3, 1956 |